July 24, 1923.
R. G. JONES
1,462,748
METHOD OF PREVENTING EMULSIFICATION OF OIL DISCHARGING FROM OIL WELLS
Filed July 6, 1920
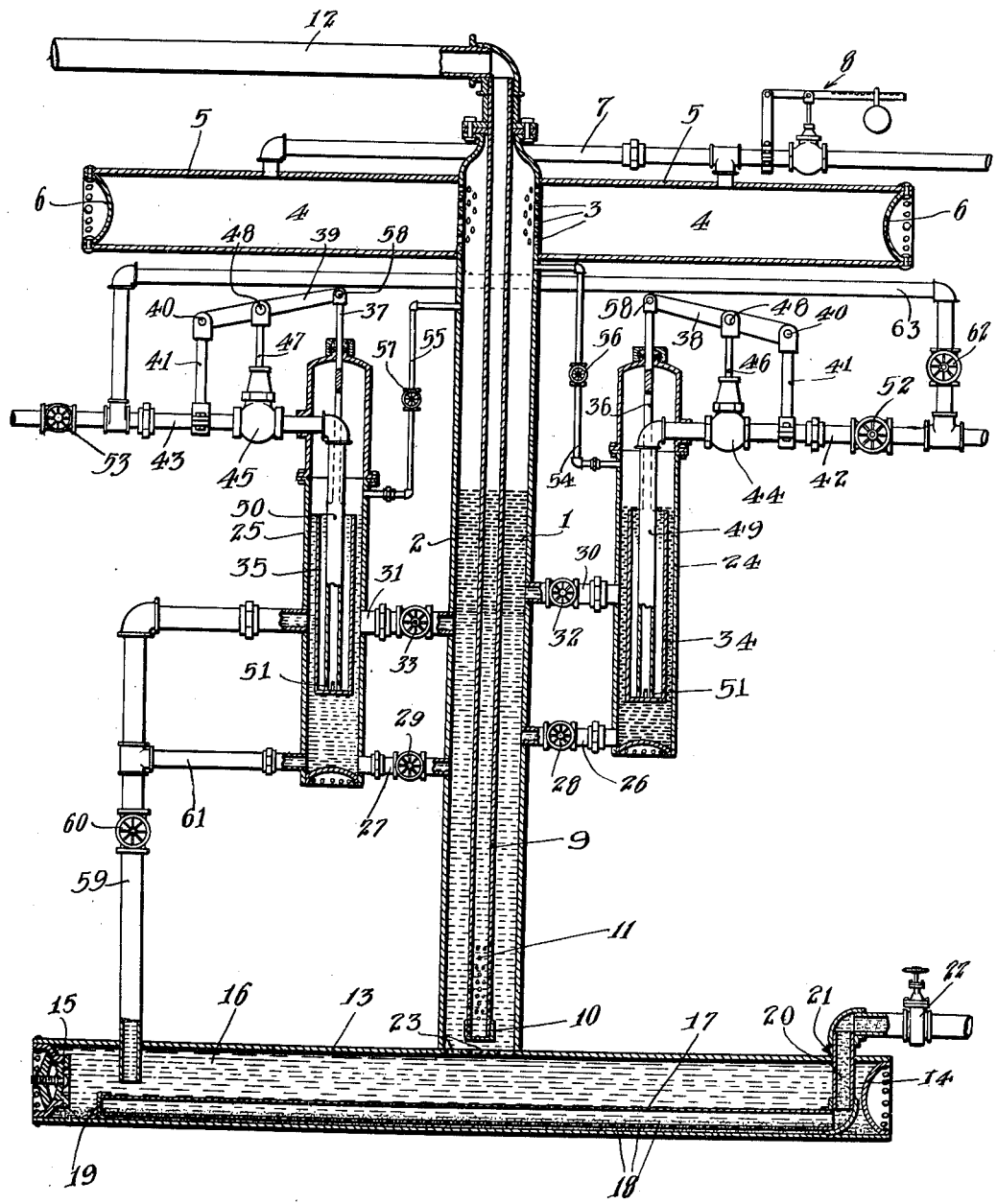
INVENTOR.
Richard Girard Jones
BY Frederick Whyou
ATTORNEY Patented July 24, 1923.

1,462,748

UNITED STATES PATENT OFFICE.

RICHARD GIRARD JONES, OF LOS ANGELES, CALIFORNIA, ASSIGNOR TO BROWN PROCESS COMPANY, OF LOS ANGELES, CALIFORNIA, A CORPORATION OF CALIFORNIA.

METHOD OF PREVENTING EMULSIFICATION OF OIL DISCHARGING FROM OIL WELLS.

Application filed July 6, 1920. Serial No. 394,067.

*To all whom it may concern:*

Be it known that I, RICHARD GIRARD JONES, a citizen of the United States, residing at Los Angeles, in the county of Los Angeles and State of California, have invented a new and useful Method of Preventing Emulsification of Oil Discharging from Oil Wells, of which the following is a specification.
This invention relates to a method whereby to prevent or minimize emulsification of oil discharging from an oil well and to separate the different constituents of a mixture, for example a mixture of gas and oil, or sand and oil, or water and oil, or any other combinations of these or other substances. The method is very useful for separating gas from oil so that, in those oil wells furnishing an insufficient amount of gas to produce natural flow, the natural gas produced by the well can be separated from the oil and returned to the well under artificial pressure to effect the pumping of the oil from the well. One great advantage in using the gas over and over for pumping the oil is that the lighter vapors produced by the well are not lost as is the case when gases are employed as pumping mediums and allowed to expand into the atmosphere.
From the foregoing it is clear that an important object of the invention is to separate gas, water and sand from oil.

Another object, which is of fully as great importance as that mentioned above, is to effect the separation of the various substances in the mixture without emulsifying the mixture. This method does not overcome emulsification, if emulsification has occurred, but the method operates in such manner that if the mixture enters the apparatus, without emulsification having been earlier produced, the separation of the different substances is effected without causing emulsification to take place in the apparatus.
Those skilled in the art pertaining to the pumping of oil understand that the so-called emulsion produced by an oil well is the result of there being water produced with the oil, and that the natural gas from a flowing well or from a well pumped thereby or other means utilized for pumping the oil agitates the oil and water sufficiently to cause emulsification. An object of this invention is to separate the oil from other substances, which may be associated therewith, without agitation and consequent emulsification of the mixture.

Another object is to effect the separation automatically at various pressures and to prevent blowing off and loss or gas when the volume of flow of the oil falls below a predetermined amount.

The accompanying drawing illustrates an apparatus for performing the invention, the view being an elevation mainly in vertical mid section of an apparatus built in accordance with the provisions of the invention and capable of carrying out the new method.

The apparatus is constructed as follows: A chamber 1 is formed by a vertical hollow member 2 which is provided near its upper end with ports 3 that afford communication between the chamber 1 and dry gas chambers 4 formed by upper horizontal hollow members 5 closed at their outer ends by heads 6. The inner ends of the hollow members 5 are welded or otherwise secured to the hollow member 2. Connected with the hollow members 5 is a pipe 7 provided with a pressure regulator 8 which may be set to maintain any desired pressure on the apparatus. In practice, the regulator 8 will be adjusted to maintain a slightly less pressure on the liquid in the apparatus than the well pressure.

Extending from the upper end of the hollow member 2 to near the lower end thereof is a tube 9 closed at its lower end by a cap 10 and having ports 11 in its lower portion. The tube 9 is connected at its upper end to a pipe 12. The lower end of the hollow member 2 is welded or otherwise secured to a lower horizontal hollow member 13 closed at its opposite ends by heads 14, 15 to form a sand and water chamber 16. Extending longitudinally in the chamber 16 is a sand and water draw-off tube 17 provided in its lower side with perforations 18, there being a cap 19 closing one end of the tube 17 and the other end of said tube being connected to a pipe 20 which passes through an opening 21 in the tubular member 13. The pipe 20 is provided with a valve 22. The chamber 1 communicates with the chamber 16 through ports 23 formed in the hollow member 13.

Arranged on opposite sides of the tubular member 2 are float chambers 24, 25. The float chambers 24, 25 are connected at their lower portions by pipes 26, 27, respectively, with the hollow member 2, said pipes having valves 28, 29, respectively. Also the float chambers 24, 25 are connected near their intermediate portions by pipes 30, 31, respectively, with the hollow member 2, said pipes being provided with valves 32, 33 respectively. The pipe 26 is at a slightly higher level than the pipe 27, and the pipe 30 is at a slightly higher level than the pipe 31.

The float chambers 24, 25 are provided with floats 34, 35, respectively, said floats in this instance being of the liquid-holding or bucket type. The rim of the float 34 is at a slightly higher level than the rim of the float 35. The floats 34, 35 are connected by members 36, 37 and pivots 58 to one end of operating levers 38, 39. The levers 38, 39 are pivoted at 40 to standards 41 mounted on pipes 42, 43, respectively. The pipes 42, 43 are provided with valves 44, 45, respectively, which in turn are operated by rods 46, 47. The rods 46, 47 are pivoted at 48 to the levers 38, 39 respectively. When the floats 34 are raised, in the positions shown in the drawings, the valves 44, 45 are closed.

The pipe 42 projects into the float chamber 24 and is provided with a vertical leg 49 which is inserted in the float 34 and extends to the bottom of said float when the float is in raised position, as in the drawing. The pipe 43 passes into the float chamber 25 and forms inside of the float chamber 25 a vertical leg 50 which is inserted in the float 35, said leg extending to the lower end of the float 35 when said float is in raised position, as in the drawing. The lower ends of the pipe legs 49, 50 are notched at 51 so that liquid can flow from the floats 34, 35 into the pipe legs 49, 50, even though the floats engage the lower ends of said legs, as they may do when the floats are in the raised positions shown in the drawing. The pipe 43 is connected by a pipe 63 with the pipe 42. The pipe 42 is provided with a valve 52 between the valve 44 and the junction of the pipe 63 with the pipe 42. The pipe 43 is provided with a valve 53, and the pipe 63 is provided with a valve 62. The float chambers 24, 25 are connected by pipes 54, 55, respectively, to the upper portion of the hollow member 2, said pipes being provided with valves 56, 57, respectively.

The apparatus described above operates to perform the new method as follows: Let it be assumed that an unemulsified body or mixture, of oil, water, gas and sand, is being inducted to the apparatus from the well through the pipe 12. If there is practically no gas pressure in the well, the pressure regulator 8 may be dispensed with or may be opened so that it does not function to maintain pressure in the apparatus. If there be an appreciable well pressure the regulator will be adjusted to a predetermined pressure slightly less than the well pressure so that the products of the well can discharge therefrom at a predetermined pressure into the apparatus without such expansion of the gases as would produce agitation and consequent emulsification of the oil were the differences of pressure in the apparatus and in the well relatively greater. The mixture inducted through the pipe 12 flows through the tube 9 and discharges through the ports 11 into the lower portion of the chamber 1 and rises in said chamber. The sand and water being the heavier gravitate to the lower portion of the chamber 1 and pass through the ports 23 into the chamber 16. The oil occupies that portion of the chamber 1 adjacent the pipe 30. The gases rise to the upper portion of the chamber 1 and pass through the ports 3 into the dry gas chambers 4 from which they are taken off through the pipe 7 at whatever pressure the regulator 8 is adjusted to.

The float chamber 25 is connected at its intermediate portion to a pipe 59 which connects with the chamber 16 and which is provided with a valve 60. The pipe 59 discharges water from the chamber 16 and has a branch 61 which is connected with the lower portion of the float chamber 25.

Assuming that the entire apparatus is to be operated, the valves 29, 33, 62 will be closed and the valves 28, 32, 52, 53, 56, 57, 60 will be opened, thus allowing the oil to flow into the float chamber 24 and the water to flow into the float chamber 25. The oil and water rise in the respective float chambers 24, 25 and flow at higher and lower levels over the upper ends of the floats 34, 35 respectively. The floats are formed of sheet metal, or other material and thus as the liquids discharge into the floats the floats are depressed thereby, thus opening the valves 44, 45 and allowing the oil and water in the respective floats to flow therefrom through the respective pipes 42, 43, the valves 52, 53 being opened to permit this. So long as the oil and water flow into the floats, as fast as the oil and water flow from the floats through the pipes 42, 43, the floats will remain depressed, but if the volume of oil and water flowing into the float chambers decreases below that capable of being discharged by the pipes 42, 43, the floats will gradually be emptied of oil and water and will rise so that by the time the liquids are exhausted from the floats the valves 44, 45 will automatically close, thus preventing gas from blowing off through the pipes 42, 43. The reason for having the rim of the float 35 at a lower level than that of the float 34 is that the oil being the lighter rises to a higher level, under a given pressure, than the water and, consequently, if it is desired that both oil and water discharge from the apparatus, the discharge level of the lighter liquid must be higher than that of the heavier liquid.

Gas in the upper portion of the float chambers 24, 25 will be drawn off therefrom through the pipes 54, 55. Also any water or sand that may be carried over into the float chamber through the pipe 30 will be discharged from said float chamber through the pipe 26. Such water and sand will gravitate to the chamber 16. The sand collecting in the chamber 16 will be drawn off through the tube 17 and pipe 20 in a manner well understood in the art to which the invention relates. Whatever gases are dissolved in the oil and water discharging into the float chambers 24, 25, will rise to the upper portion of said chambers and escape into the chamber 1 through the pipes 54, 55.

It is understood that either of the float chambers may be utilized independent of the other by opening and closing the appropriate valves. This is especially important if any of the working parts associated with either float chamber require repairs. For example, if it be desired to cut off the float chamber 24, the valves 28, 32, 52, 53 and 56 will be closed and the valve 62 opened.

From the foregoing it will be understood that in the method I introduce the mixture being treated into a column of liquid below the surface of said column; that I draw off the gas from the space above the column; that I discharge the water and sand from the lower end of the column; that I discharge the oil from the upper portion of the column into a second liquid column; that I draw off the oil from the second liquid column; that I draw off the gas from the space above the second liquid column; and that I discharge the oil and water at different levels from the first liquid column into two separate liquid columns. The method also includes discharging the oil at any pressure and regulating the off-flow of the liquids from the mixture in accordance with the volume of flow of the mixture.

I claim:

1. The method of preventing emulsification of oil discharging from an oil well, which includes introducing the mixture of oil, water and gas at the well discharge pressure into a column of oil and water under less pressure and under greater pressure than atmospheric below the surface thereof, discharging gas as it rises from the first column, discharging oil and water at different levels from the first column into other liquid columns under the less pressure, and finally discharging the oil and water at different levels from said other liquid columns.

2. The method of preventing emulsification of oil discharging from an oil well, which includes introducing the mixture of oil, water and gas at the well discharge pressure into a column of oil and water under less pressure and under greater pressure than atmospheric below the surface thereof, discharging the gas from the space above the column as it rises, discharging oil and a portion of the water from the first column into a second liquid column under the less pressure, and discharging oil and water at different levels from the second column.

3. The method of preventing emulsification of oil discharging from an oil well, which includes introducing the mixture of oil, water and gas at the well discharge pressure into a column of oil and water under less pressure and under greater pressure than atmospheric below the surface thereof, discharging the gas from the space above the column as it rises, discharging oil and water at different levels from the first column into other liquid columns respectively under the less pressure, and finally discharging the liquids from said other columns.

4. The method of preventing emulsification of oil discharging from an oil well, which includes introducing the mixture of oil, water and gas at the well discharge pressure into a column of oil and water under less pressure and under greater pressure than atmospheric below the surface thereof, discharging the oil and a portion of the water with a portion of the gas from the first column into a second liquid column, discharging oil and water from the second column, and discharging the gas from the space above the first and second columns as it rises.

5. The method of preventing emulsification of oil discharging from an oil well, which includes introducing the mixture of oil, water and gas at the well discharge pressure into a column of oil and water under less pressure and under greater pressure than atmospheric below the surface thereof, discharging the water and oil together with a portion of the gas at different levels from the first column into other liquid columns respectively under the less pressure, discharging the oil and water from the respective second columns, and discharging the gas from the space above the first and second columns as it rises.

6. The method of preventing emulsification of oil discharging from an oil well, which includes introducing the mixture of oil, water and gas at the well discharge pressure into a column of oil and water under less pressure and under greater pressure than atmospheric below the surface thereof, discharging gas from the space above the column as it rises, discharging water from the lower portion of the column, discharging oil from the intermediate portion of the column into a column of oil, and discharging oil from the second column.

7. The method of preventing emulsification of oil discharging from an oil well, which includes introducing the mixture of oil, water and gas at the well discharge pressure into a column of oil and water under less pressure below the surface thereof, discharging water from the lower portion of the column under the less pressure, discharging oil with a portion of the gas from the intermediate portion of the column into a column of oil under the less pressure, discharging the oil from the second column, and discharging the gas from the space above the first and second columns as it rises.

8. The method of preventing emulsification of oil discharging from an oil well, which includes introducing the mixture of oil, water and gas at the well discharge pressure into a column of oil and water under less pressure and under greater pressure than atmospheric below the surface thereof, discharging gas from the space above the column when the gas reaches a predetermined pressure, discharging oil from the first column into a second column, and discharging oil from the second column only when the oil is above a predetermined level.

9. The method of preventing emulsification of oil discharging from an oil well, which includes introducing the mixture of oil, water and gas at the well discharge pressure into a column of oil and water under less pressure and under greater pressure than atmospheric below the surface thereof, discharging gas from the space above the column when the gas reaches a predetermined pressure, discharging water from the lower portion of the first column into a second column, discharging oil from the intermediate portion of the first column into a third column, discharging oil from the third column only when the oil is above a predetermined level, and discharging water from the second column only when the water is above a predetermined level.

Signed at Los Angeles, California, this 29th day of June, 1920.

RICHARD GIRARD JONES.

Witnesses:
GEORGE H. HILES,
L. BELLE WEAVER.